United States Patent
Mortimore, Jr. et al.

(10) Patent No.: US 10,705,928 B2
(45) Date of Patent: Jul. 7, 2020

(54) SYSTEMS, METHODS, AND APPARATUSES FOR TENANT-TO-TENANT FAILOVER IN A MULTI-TENANT CLOUD COMPUTING ENVIRONMENT

(71) Applicant: salesforce.com, inc., San Francisco, CA (US)

(72) Inventors: William Charles Mortimore, Jr., San Francisco, CA (US); Matthew Wong, Castro Valley, CA (US); Matthew Bahrenburg, San Francisco, CA (US); Puneet Dhaliwal, Hayward, CA (US); Anupam Jain, Vancouver (CA); Steven S. Lawrance, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 129 days.

(21) Appl. No.: 16/115,472

(22) Filed: Aug. 28, 2018

(65) Prior Publication Data

US 2020/0073770 A1    Mar. 5, 2020

(51) Int. Cl.
*G06F 11/20*    (2006.01)
*H04L 12/24*    (2006.01)

(52) U.S. Cl.
CPC .......... *G06F 11/2025* (2013.01); *H04L 41/06* (2013.01); *H04L 41/0654* (2013.01)

(58) Field of Classification Search
CPC ... G06F 11/2025; H04L 41/06; H04L 41/0654
See application file for complete search history.

(56) References Cited

U.S. PATENT DOCUMENTS

| | | | |
|---|---|---|---|
| 7,860,964 B2* | 12/2010 | Brady | H04L 47/20 709/223 |
| 8,458,298 B2* | 6/2013 | Josefsberg | H04L 41/0654 709/220 |
| 8,958,282 B2* | 2/2015 | Ballard | H04L 41/06 370/217 |
| 2014/0280910 A1* | 9/2014 | Swig | H04L 45/308 709/224 |

* cited by examiner

*Primary Examiner* — Joseph R Kudirka
(74) *Attorney, Agent, or Firm* — Elliot, Ostrander & Preston, P.C.

(57) ABSTRACT

Systems, methods, and apparatuses for implementing tenant-to-tenant failover in a multi-tenant could computing environment. An exemplary system having at least a processor and a memory therein includes means for identifying a first one of a plurality of tenants in a multi-tenant cloud computing system as a primary tenant for providing a function, identifying a second one of the plurality of tenants in the multi-tenant cloud computing system as a secondary tenant for providing the function should the primary tenant become unavailable, providing the function in the multi-tenant cloud computing system via the primary tenant when the primary tenant is available, and switching to providing the function in the multi-tenant cloud computing environment via the secondary tenant when the primary tenant is unavailable and the secondary tenant is available.

21 Claims, 13 Drawing Sheets

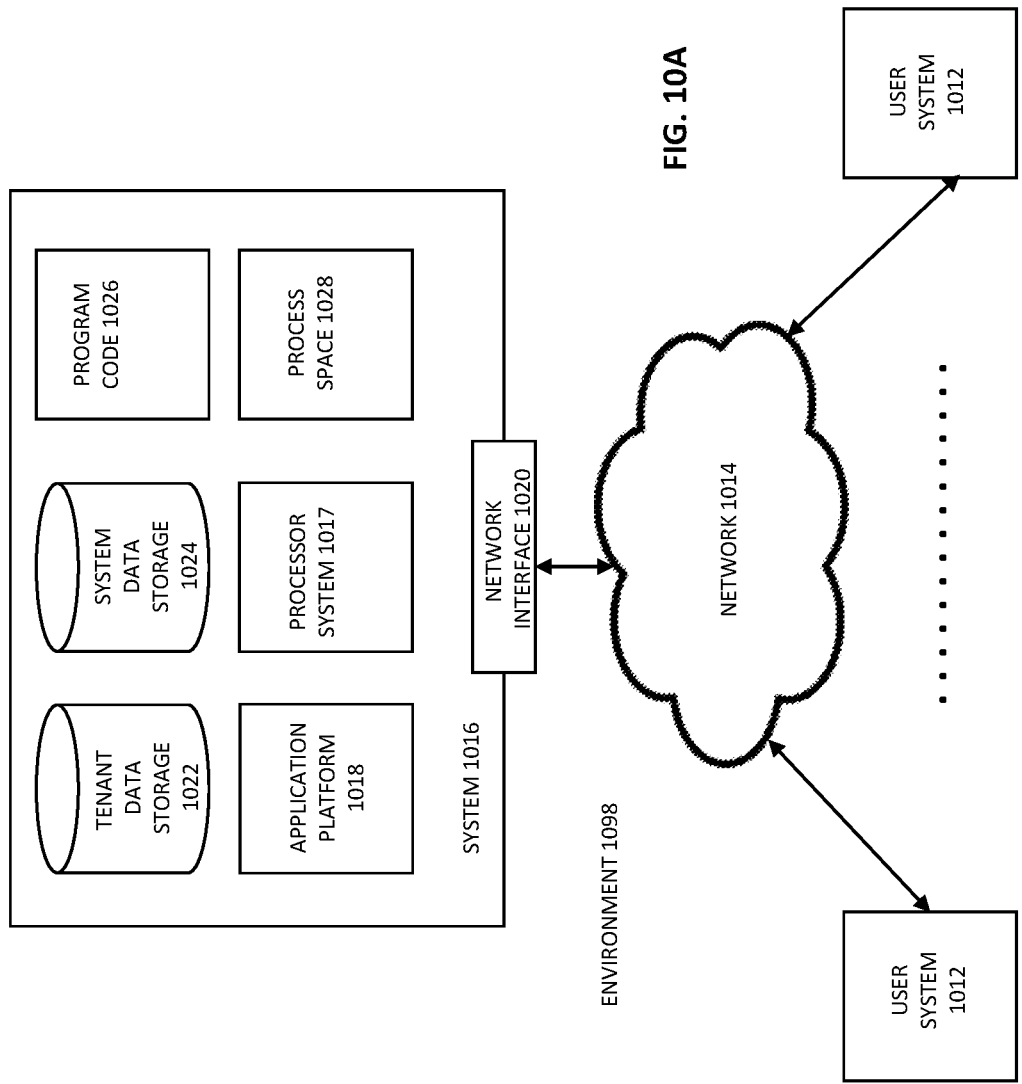

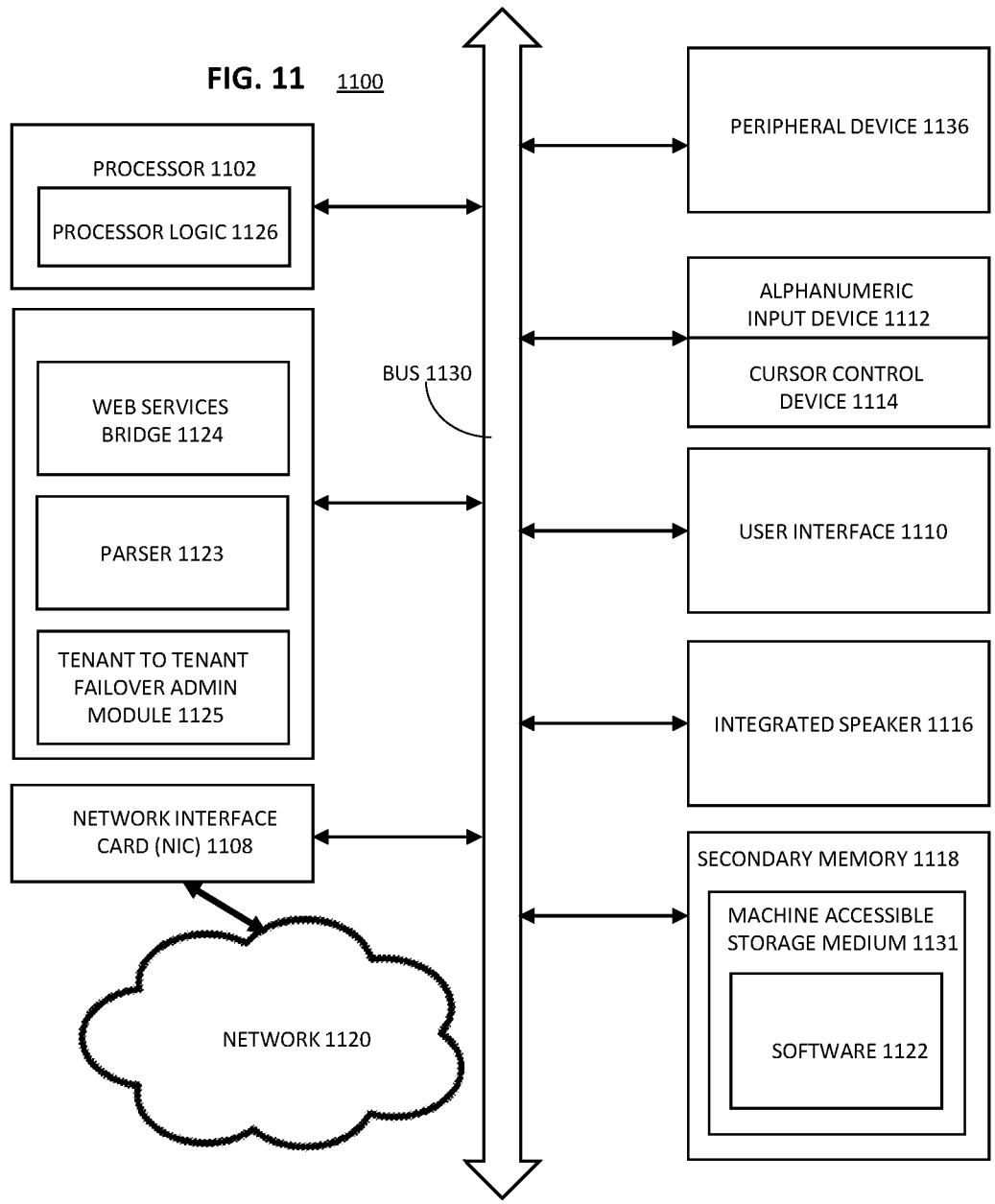

SYSTEMS, METHODS, AND APPARATUSES FOR TENANT-TO-TENANT FAILOVER IN A MULTI-TENANT CLOUD COMPUTING ENVIRONMENT

CLAIM OF PRIORITY

None.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

Embodiments disclosed herein relate generally to the field of computing, and more particularly, to systems, methods, and apparatuses for implementing tenant-to-tenant failover in a multi-tenant cloud computing environment supported by a processor and a memory to execute such functionality. Such means may be implemented within the computing architecture of a hosted computing environment, such as an on-demand or cloud-computing environment that utilizes multi-tenant database technologies, client-server technologies, traditional database technologies, or other computing architecture in support of the hosted computing environment.

BACKGROUND

The subject matter discussed in this background section should not necessarily be construed as prior art merely because of its mention in this section. Similarly, a problem mentioned in this section or associated with the subject matter of this section should not be construed as being previously recognized in the prior art. The subject matter in this section merely represents different approaches, which in and of themselves may also correspond to claimed embodiments.

A multi-tenant cloud computing services provider may have multiple points of deployment (PODs). A POD is also known as an Instance and it is a self-contained unit that contains all that is required to provide cloud computing services to customers, including an application server, database server, database itself, search and file system, etc. Each customer organization typically is allocated to one and only POD and that is where their data resides. A POD contains redundant data centers with clones of everything so the POD does not go offline just because one element of one data center fails. However, in the highly unlikely event that an entire POD goes offline, or a single tenant that provides an exclusive resource, or the resource itself, that other tenants in the multi-tenant cloud computing services access goes off-line, the other tenants may be negatively impacted. The present state of the art may therefore benefit from the systems, methods, and apparatuses for implementing tenant-to-tenant failover in a multi-tenant cloud computing environment as is described herein.

BRIEF DESCRIPTION OF THE DRAWINGS

Embodiments are illustrated by way of example, and not by way of limitation, and will be more fully understood with reference to the following detailed description when considered in connection with the figures in which:

FIG. 10A illustrates a block diagram of an environment in which an on-demand database service may operate in accordance with the described embodiments;

FIG. 11 illustrates a diagrammatic representation of a machine in the exemplary form of a computer system, in accordance with one embodiment.

DETAILED DESCRIPTION

Figure 1:
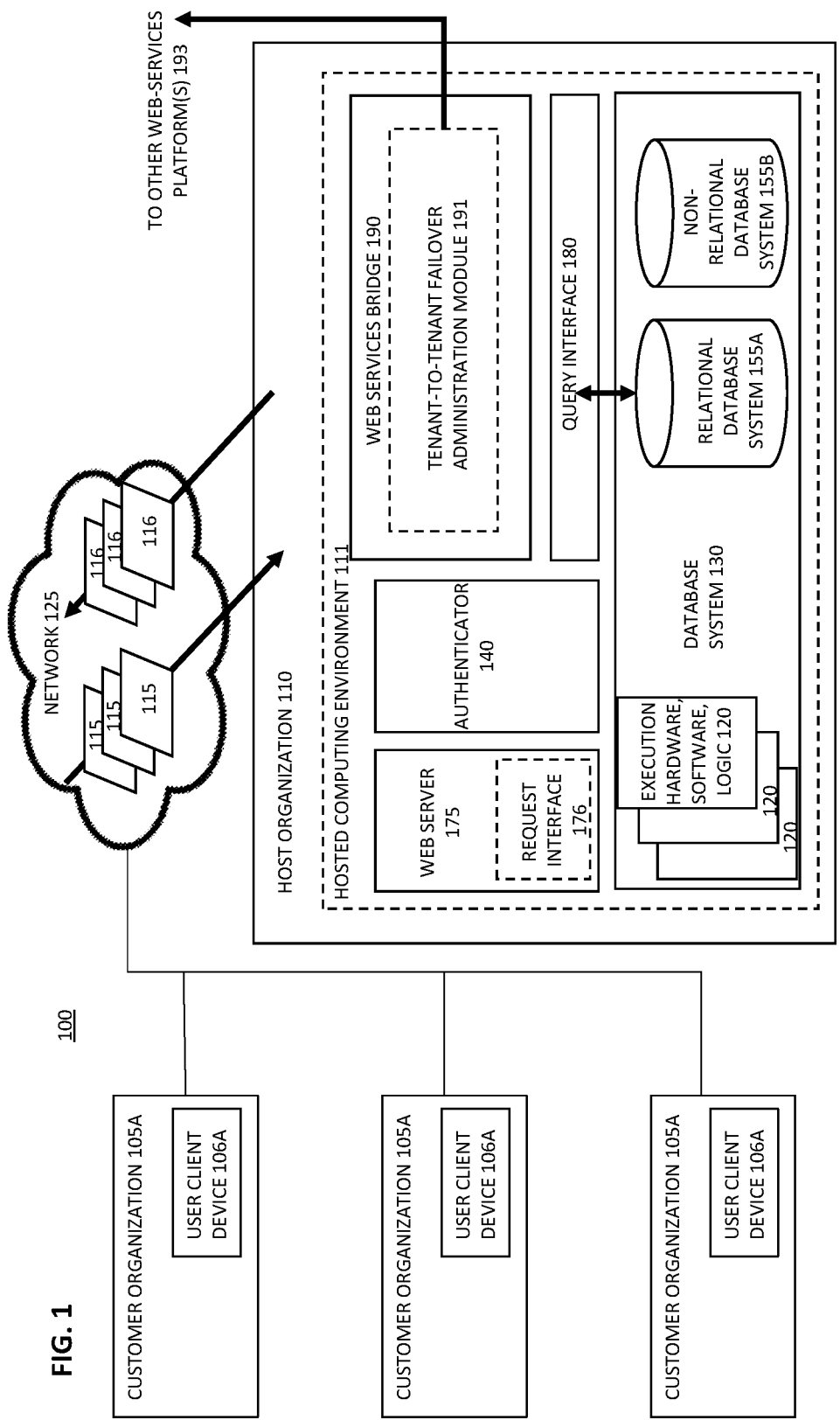
FIG. 1 depicts an exemplary architecture in accordance with described embodiments.

Described herein are systems, methods, and apparatuses for implementing tenant-to-tenant failover in a multi-tenant cloud computing environment. For instance, such an exemplary system having a processor and a memory therein includes a method performed by a system having at least a processor and a memory therein, the method comprising identifying a first one of a plurality of tenants in a multi-tenant cloud computing system as a primary tenant for providing a business function, e.g., a business function, identifying a second one of the plurality of tenants in the multi-tenant cloud computing system as a secondary tenant for providing the function should the primary tenant become unavailable, providing the function in the multi-tenant cloud computing system via the primary tenant when the primary tenant is available, switching to providing the function in the multi-tenant cloud computing environment via the secondary tenant when the primary tenant is unavailable and the secondary tenant is available. In the following description, numerous specific details are set forth such as examples of specific systems, languages, components, etc., in order to provide a thorough understanding of the various embodiments. It will be apparent, however, to one skilled in the art that these specific details need not be employed to practice the embodiments disclosed herein. In other instances, well-known materials or methods are described in detail in order to avoid unnecessarily obscuring the disclosed embodiments.

In addition to various hardware components depicted in the figures and described herein, embodiments further include various operations that are described below. The operations described in accordance with such embodiments may be performed by hardware components or may be embodied in machine-executable instructions, which may be used to cause a general-purpose or special-purpose processor programmed with the instructions to perform the operations. Alternatively, the operations may be performed by a combination of hardware and software.

Embodiments also relate to an apparatus for performing the operations disclosed herein. This apparatus may be specially constructed for the required purposes, or it may be a general purpose computer selectively activated, configured, or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems appears as set forth in the description below. In addition, embodiments are not described with reference to any particular programming language. It will be appreciated that a variety of programming languages may be used to implement the teachings of the embodiments as described herein.

Embodiments may be provided as a computer program product, or software, that may include a machine-readable medium having stored thereon instructions, which may be used to program a computer system (or other programmable electronic devices) to perform a process according to the disclosed embodiments. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical), etc.

Any of the disclosed embodiments may be used alone or together with one another in any combination. Although various embodiments may have been partially motivated by deficiencies with conventional techniques and approaches, some of which are described or alluded to within the specification, the embodiments need not necessarily address or solve any of these deficiencies, but rather, may address only some of the deficiencies, address none of the deficiencies, or be directed toward different deficiencies and problems which are not directly discussed.

FIG. 1 depicts an exemplary architecture 100 in accordance with described embodiments. In one embodiment, a hosted computing environment 111 is communicably interfaced with a plurality of user client devices 106A-C (e.g., such as mobile devices, smart phones, tablets, PCs, etc.) through host organization 110. In one embodiment, a database system 130 includes databases 155A and 155B, for example, to store application code, object data, tables, datasets, and underlying database records with user data on behalf of customer organizations 105A-C (e.g., users of such a database system 130 or tenants of a multi-tenant database type database system or the affiliated users of such a database system). Such databases include various database system types including, for example, a relational database system 155A and a non-relational database system 155B according to certain embodiments.

Certain embodiments may utilize a client-server computing architecture to supplement features, functionality, or computing resources for the database system 130 or alternatively, a computing grid, or a pool of work servers, or some combination of hosted computing architectures may be utilized to carry out the computational workload and processing demanded of the host organization 110 in conjunction with the database system 130.

The database system 130 depicted in the embodiment shown includes a plurality of underlying hardware, software, and logic elements 120 that implement database functionality and a code execution environment within the host organization 110.

In accordance with one embodiment, database system 130 utilizes the underlying database system implementations 155A and 155B to service database queries and other data interactions with the database system 130 that communicate with the database system 130 via the query interface. The hardware, software, and logic elements 120 of the database system 130 are separate and distinct from a plurality of customer organizations (105A, 105B, and 105C) which utilize web services and other service offerings as provided by the host organization 110 by communicably interfacing to the host organization 110 via network 125. In such a way, host organization 110 may implement on-demand services, on-demand database services or cloud computing services to subscribing customer organizations 105A-C.

Further depicted is the host organization 110 receiving input and other requests 115 from a plurality of customer organizations 105A-C via network 125 (such as a public Internet). For example, incoming search queries, database queries, API requests, interactions with displayed graphical user interfaces and displays at the user client devices 106A-C, or other inputs may be received from the customer organizations 105A-C to be processed against the database system 130, or such queries may be constructed from the inputs and other requests 115 for execution against the databases 155 or the query interface 180, pursuant to which results 116 are then returned to an originator or requestor, such as a user of one of a user client device 106A-C at a customer organization 105A-C.

In one embodiment, each customer organization 105A-C is an entity selected from the group consisting of: a separate and distinct remote organization, an organizational group within the host organization 110, a business partner of the host organization 110, or a customer organization 105A-C that subscribes to cloud computing services provided by the host organization 110.

In one embodiment, requests 115 are received at, or submitted to, a web-server 175 within host organization 110. Host organization 110 may receive a variety of requests for processing by the host organization 110 and its database system 130. Incoming requests 115 received at web-server 175 may specify which services from the host organization 110 are to be provided, such as query requests, search request, status requests, database transactions, graphical user interface requests and interactions, processing requests to retrieve, update, or store data on behalf of one of the customer organizations 105A-C, code execution requests, and so forth. Web-server 175 may be responsible for receiving requests 115 from various customer organizations 105A-C via network 125 on behalf of the query interface 180 and for providing a web-based interface or other graphical displays to an end-user user client device 106A-C or machine originating such data requests 115.

The query interface 180 is capable of receiving and executing requested queries against the databases and storage components of the database system 130 so as to return a result set, response, or other requested data in furtherance of the methodologies described. The query interface 180 additionally provides functionality to pass queries from web-server 175 into the database system 130 for execution against the databases 155 for processing search queries, or into the other available data stores of the host organization's computing environment 111. In one embodiment, the query interface 180 implements an Application Programming Interface (API) through which queries may be executed against the databases 155 or the other data stores.

Host organization 110 may implement a request interface 176 via web-server 175 or as a stand-alone interface to receive requests packets or other requests 115 from the user client devices 106A-C. Request interface 176 further supports the return of response packets or other replies and responses 116 in an outgoing direction from host organization 110 to the user client devices 106A-C.

Authenticator 140 operates on behalf of the host organization to verify, authenticate, and otherwise credential users attempting to gain access to the host organization.

Still further depicted within the hosted computing environment 111 is the web-services bridge 190 having therein both a tenant-to-tenant failover administration module 191 capable of communicating with other web-services platform(s) 193 which regardless of whether such web-services platforms are hosted by the same host organizations 110 or hosted by different host organizations.

Figure 2:
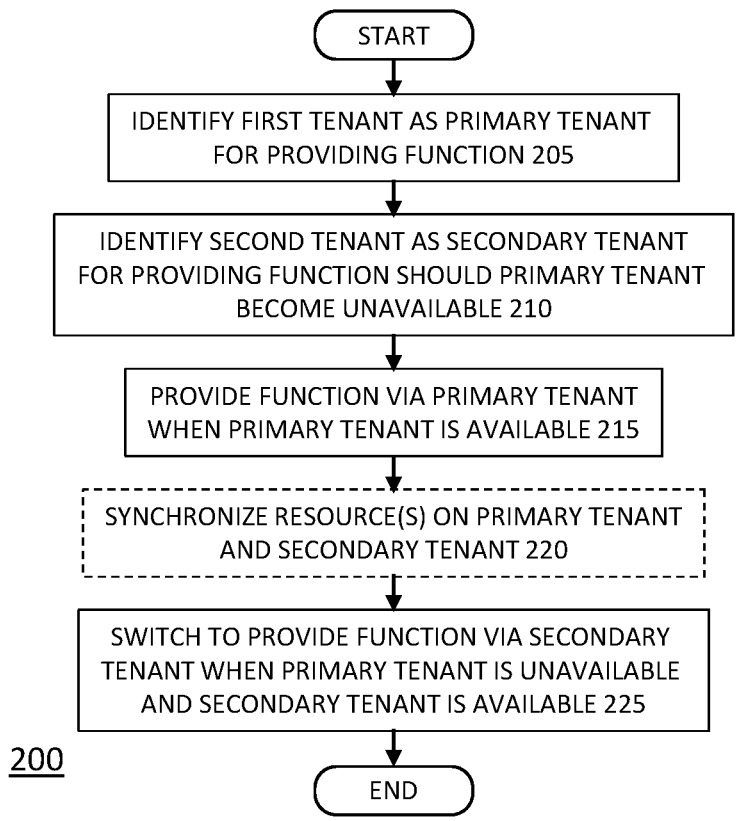
FIG. 2 depicts a flow diagram illustrating a method for implementing tenant-to-tenant failover within a multi-tenant cloud based computing environment in accordance with disclosed embodiments.

FIG. 2 depicts a flow diagram illustrating a method 200 for implementing tenant-to-tenant failover within a multi-tenant cloud based computing environment in accordance with the disclosed embodiments. Method 200 may be performed by processing logic that may include hardware (e.g., circuitry, dedicated logic, programmable logic, microcode, etc.), software (e.g., instructions run on a processing device) to perform various operations such as designing, defining, retrieving, parsing, persisting, exposing, loading, executing, operating, receiving, generating, storing, maintaining, creating, returning, presenting, interfacing, communicating, transmitting, querying, processing, providing, determining, triggering, displaying, updating, sending, etc., in pursuance of the systems and methods as described herein. For example, the hosted computing environment 111, the web-services bridge 190, and its database system 130 as depicted at FIG. 1, and other systems and components as described herein may implement the described methodologies. Some of the blocks and/or operations listed below are optional in accordance with certain embodiments. The numbering of the blocks presented is for the sake of clarity and is not intended to prescribe an order of operations in which the various blocks must occur.

With reference to the method 200 depicted at FIG. 2, at block 205, processing logic executing within a host organization identifies a first one of a plurality of tenants in a multi-tenant cloud computing system as a primary tenant for providing a function or resource. In one embodiment, the function is a business function that other tenants in the system access to perform some function or provide some service, e.g., the function of an identity service provider (IdP) for Security Assertion Markup Language (SAML) based web browser single sign on (SSO). In this particular example, the tenant belongs to and/or is operated by or on behalf of the multi-tenant cloud computing system service provider. In another embodiment, the tenant may be associated with a third party organization. In any case, this primary tenant may be accessible at a particular uniform resource locator (URL) string, e.g., aloha.mysalesforce.com.

According to the embodiment, logic block 210 identifies a second one of the plurality of tenants in the multi-tenant cloud computing system as a secondary tenant for providing the function in the event that the primary tenant become unavailable, goes offline, or is otherwise nonresponsive for some period of time or series of events. This secondary tenant may be accessible at a particular uniform resource locator (URL) string different from the URL string for the primary tenant, e.g., aloha2.mysalesforce.com. At logic block 215, so long as the primary tenant is available, the embodiment provides the function in the multi-tenant cloud computing system via the primary tenant. However, at logic block 225, if the primary tenant becomes unavailable or inaccessible, the embodiment switches to providing the function in the multi-tenant cloud computing environment via the secondary tenant.

Depending on the function or resource being provided by the primary tenant, it may be appropriate to synchronize one or more respective resources on the primary tenant and the secondary tenant in anticipation of the switch to providing the function in the multi-tenant cloud computing environment via the secondary tenant when the primary tenant is unavailable and the secondary tenant is available, at logic block 220. So, for example, in the case of providing SAML-based SSO, it may be beneficial to copy selected certificates and single sign-on configurations from aloha.mysalesforce.com to aloha2.mysalesforce.com so that in the event the function become unavailable at aloha.mysalesforce.com, the fail over to providing such services at aloha2.mysalesforce.com happens more quickly, causing less disruption to applications executing on other tenants in the multi-tenant cloud computing system that rely on the service.

Figure 3:
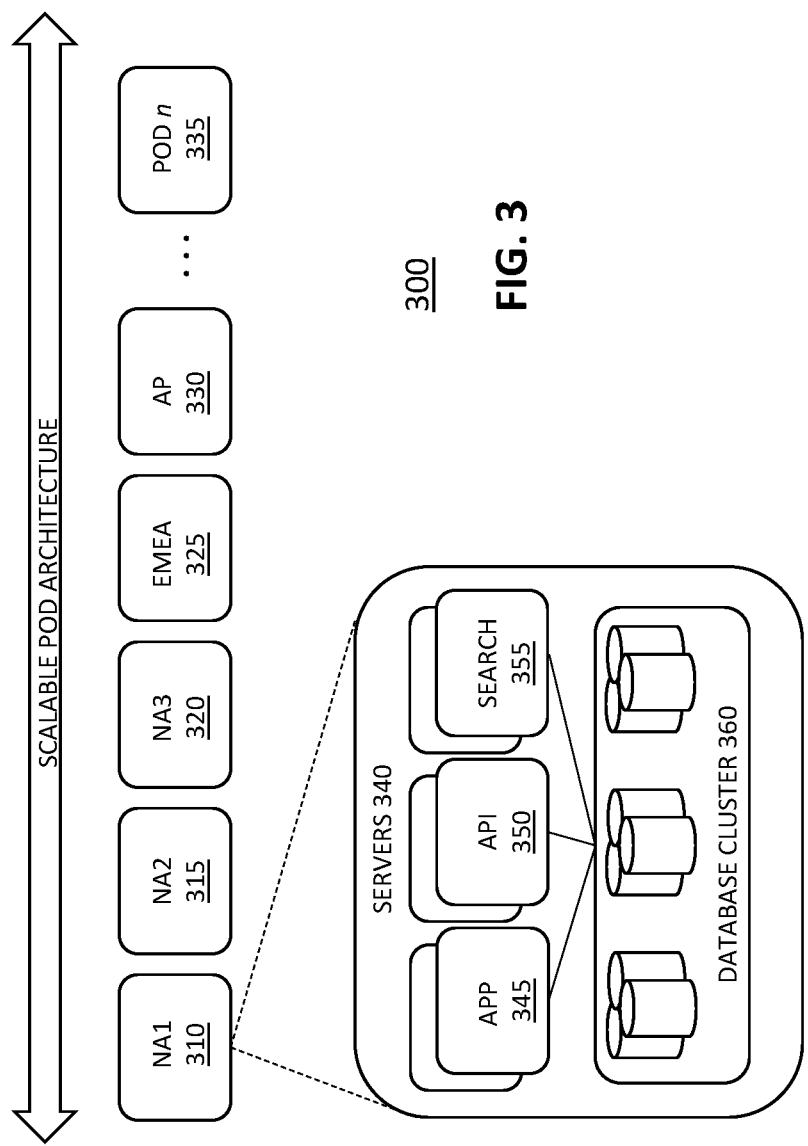
FIG. 3 depicts multiple points of deployment of tenants in a multi-tenant cloud based computing environment in accordance with disclosed embodiments.

With reference to FIG. 3, one embodiment 300 of the multi-tenant cloud computing system comprises a plurality of points of deployment 310, 215, 320, 325, 330, and 335, among which the plurality of tenants are distributed, wherein each of the plurality of tenants is assigned to only a single point of deployment. In such an embodiment, the logic 205 that causes the system to identify the first one of the plurality of tenants as the primary tenant for providing the function assigns the first tenant to a first one of the plurality of points of deployment, e.g., the North American 1 (NA1) POD 310, as the primary tenant for providing the function. Similarly, the logic block 210 that causes the system to identify the second one of the plurality of tenants as the secondary tenant for providing the function should the primary tenant become unavailable assigns the second tenant to a second one of the plurality of points of deployment, e.g., the North American 2 (NA2) POD 315, as the secondary tenant for providing the function should the primary tenant become unavailable.

Ideally, as described above, in one embodiment, the secondary tenant is on a different POD, so in the highly unlikely event a POD goes down, is offline, or is otherwise unavailable or inaccessible, or all the tenants on the POD go down, are offline, or otherwise unavailable or inaccessible, tenants existing in other PODs in the cloud service provider's network can access the secondary tenant on a different POD. It is possible, in an embodiment, of course, for the secondary tenant to be implemented on the same POD as the primary tenant, or even the same data center or application server 345 within the POD.

Some multi-tenant cloud computing system service providers, such as the assignee of the present invention, Salesforce, group together some number of customers, e.g., 10,000 into a single Point of Deployment (POD). A POD may also known as an Instance, and is understood to be a self contained unit that includes all that is required to run the cloud computing services, including the application server 345, database server, database 360, search and file system 355, and API system 350. Each customer is allocated to one and only POD and that is where their data resides. A POD contains redundant data centers with clones of everything so the POD doesn't go offline just because one element of one data center fails. A customer can determine which instance they are using by checking the URL after login. In the example below, the customer is on the ap1 instance.

https://ap1.salesforce.com/home/home.jsp

It may be that a customer does not see the instance in the URL if they are using a custom domain, in which case the URL will be something like:

https://xxx.my.salesforce.com/home/home.jsp

A Salesforce Org, or Organization, or org, or tenant, is an identifier that represents a customer's version of Salesforce and its data within an instance (POD). As all customers within an instance are sharing the same database, the org id is stored in every table to ensure that every row of data is linked back to the correct customer and the data from other customers sharing the same instance cannot be mixed up. A Salesforce Environment is a Salesforce org that is used for a specific purpose, e.g., production environment, development environment, testing environment. Non-production orgs are housed in what is referred to as a Sandbox instance.

Figure 4:
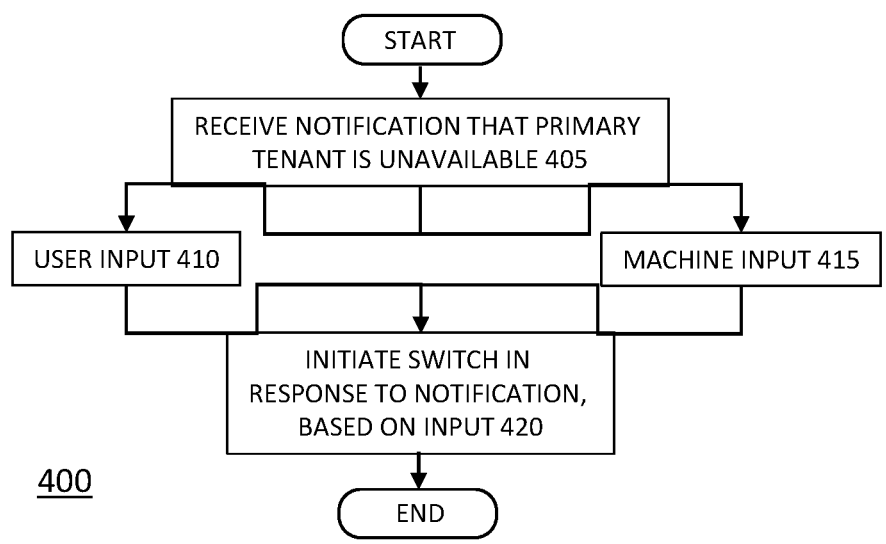
FIG. 4 depicts a flow diagram illustrating aspects of tenant-to-tenant failover within a multi-tenant cloud based computing environment in accordance with disclosed embodiments.

With reference to FIG. 4, further details are provided regarding the switching logic 225 to provide the function in the multi-tenant cloud computing environment via the secondary tenant when the primary tenant is unavailable and the secondary tenant. In the embodiment 400, logic block 405 receives a notification that the primary tenant is unavailable, and at logic block 420, initiate the switch, responsive to receipt of the notification. In one embodiment, the switch is initiated upon first receiving user input at 410 to initiate the switching, or, upon logic block 420 receiving machine input to automatically initiate the switching. In the case of user input 410, a system administrator is able to first review the notification that the primary tenant is unavailable, assess the problem, and make a determination based on various factors such as timeline since failure and when the problem might be resolved, whether to initiate the switch at logic block 420. On the other hand, automatic input at logic block 415 involves the system performing some operation, such as PING of the domain name of the primary tenant, and if the PING times out after a certain period of time or otherwise expires before a response is received, the system assumes the primary is unavailable and initiates the switch at logic block 420.

Figure 5:
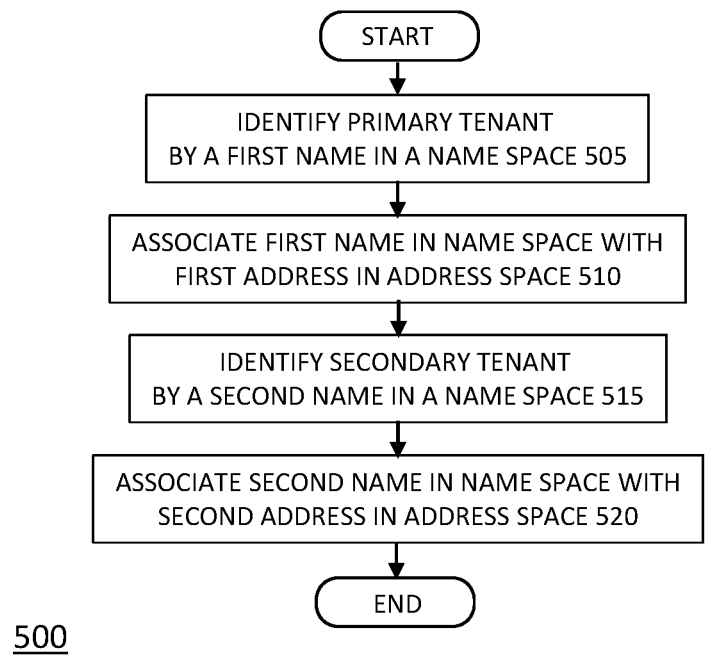
FIG. 5 depicts a flow diagram illustrating aspects of tenant-to-tenant failover within a multi-tenant cloud based computing environment in accordance with disclosed embodiments.

With reference to FIG. 5, further details are provided regarding the logic block 205 that identifies the first one of the plurality of tenants in the multi-tenant cloud computing system as the primary tenant for providing the function. In one embodiment, logic block 505 identifies the primary tenant by a first name in a name space, and then associates the first name in the name space with a first address in an address space at logic block 510. Similarly, logic block 515 identifies the second one of the plurality of tenants in the multi-tenant cloud computing system as the secondary tenant for providing the function should the primary tenant become unavailable by identifying the secondary tenant by a second name in the name space, and logic block 520 associates the second name in the name space with a second address in the address space.

Figure 6:
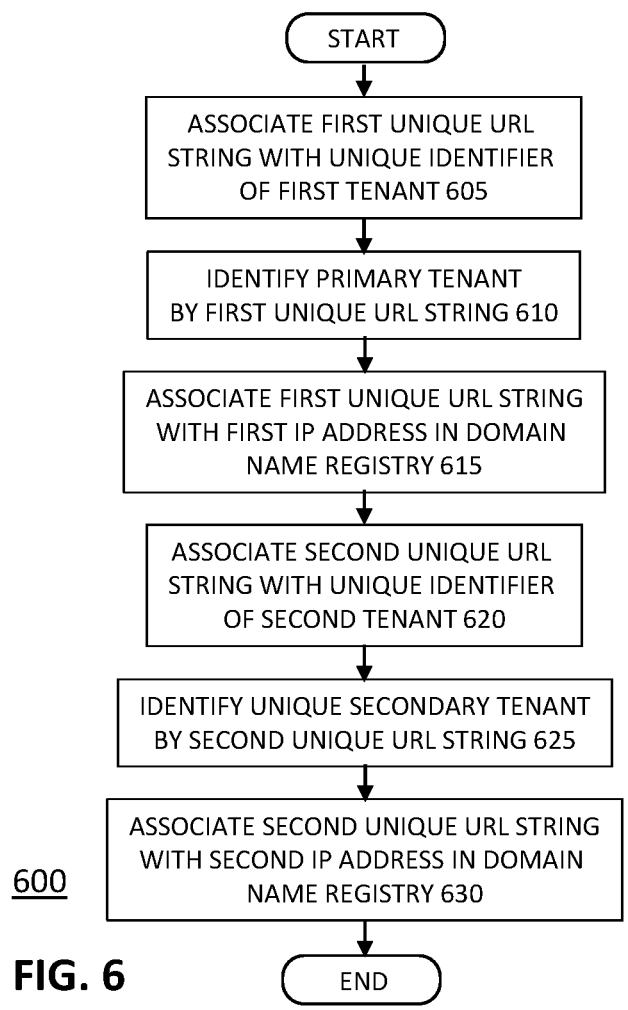
FIG. 6 depicts a flow diagram illustrating aspects of tenant-to-tenant failover within a multi-tenant cloud based computing environment in accordance with disclosed embodiments.

FIG. 6 provides a specific example of the process for associating names in the name space with the primary and secondary tenants, and for associating names in the name space with addresses in the address space referenced in FIG. 5. In particular, logic block 605 identifies the primary tenant by the first name in the name space by associating a first unique Uniform Resource Locator (URL) string with a unique identifier (e.g., a Salesforce organization identifier, or org id) of the first one of the plurality of tenants in the multi-tenant cloud computing system, and logic block 610 identifies the primary tenant by the first unique URL string. Thereafter, logic block 614 associates the first name in the name space with the first address in an address space by associating the first unique URL string with a first Internet Protocol (IP) address in the domain name registry.

Similarly, logic block 620 identifies the secondary tenant by the second name in the name space by associating a second unique Uniform Resource Locator (URL) string with a unique identifier (Salesforce org id) of the second one of the plurality of tenants in the multi-tenant cloud computing system. Logic block 625 identifies the secondary tenant by the second unique URL string, and logic block 630 associates the second name in the name space with the second address in the address space by associating the second unique URL string with a second Internet Protocol (IP) address in the domain name registry.

Figure 7A:
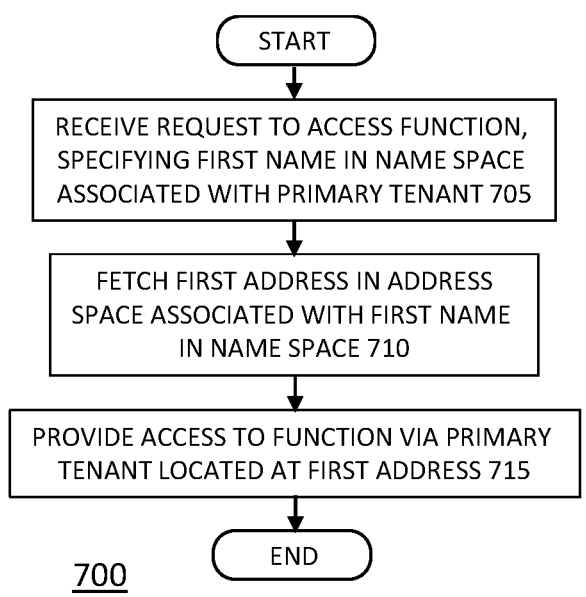
FIG. 7A depicts a flow diagram illustrating aspects of tenant-to-tenant failover within a multi-tenant cloud based computing environment in accordance with disclosed embodiments.

With reference to FIG. 7A, further details are provided regarding the logic block 215 that provides the function in the multi-tenant cloud computing system via the primary tenant when the primary tenant is available. In one embodiment, logic block 705 receives a request to access the function, the request specifying the first name in the name space associated with the primary tenant, e.g., a URL string identifying a domain name for the primary tenant. In response thereto, logic block 710 fetches the first address in the address space associated with the first name in the name space, e.g., an IP address, and logic block 715 provides access to the function via the primary tenant located at the first address.

Figure 7B:
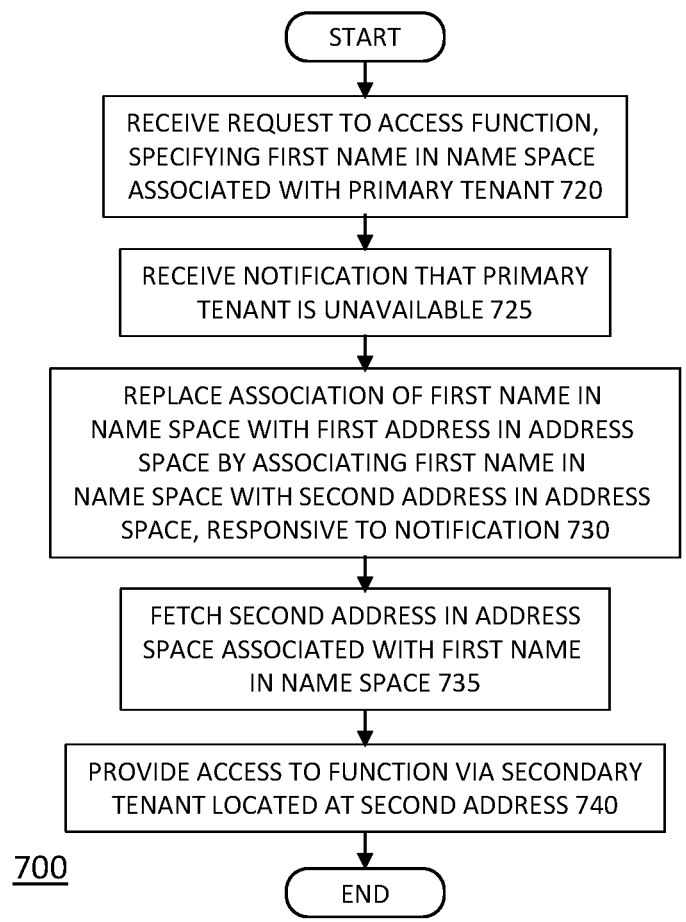
FIG. 7B depicts a flow diagram illustrating aspects of tenant-to-tenant failover within a multi-tenant cloud based computing environment in accordance with disclosed embodiments.

FIG. 7B provides further details regarding the logic 225 that causes the system to switch to providing the function in the multi-tenant cloud computing environment via the secondary tenant when the primary tenant is unavailable and the secondary tenant is available. In particular, logic block 720 receives a request to access the function, the request specifying the first name in the name space associated with the primary tenant, e.g., a URL string identifying a domain name for the primary tenant. Logic block 725 at some point receives a notification that the primary tenant is unavailable, and logic block 730, in response thereto, replaces the association of the first name in the name space with the first address in the address space by associating the first name in the name space with the second address in the address space. For example, the entry for the primary tenant in the domain name registry is updated by replacing the IP address previously associated with the primary tenant's domain name with the IP address associated with the secondary tenant's domain name. In this way, other tenants need not know, or detect, and modify their information to redirect requests to access the function to a different domain name. From the tenants' perspective, the domain name remains the same, and the cloud computing services provider revises the IP address to which the access requests for the function are redirected, so as to be completely transparent to the tenants. Thereafter, logic block 735 fetches the second address in the address space associated with the first name in the name space, that is, the revised or replaced IP address for the primary tenant's domain name, and logic block 740 provides access to the function via the secondary tenant located at the second address, unbeknownst to the tenants accessing the function.

Figure 8:
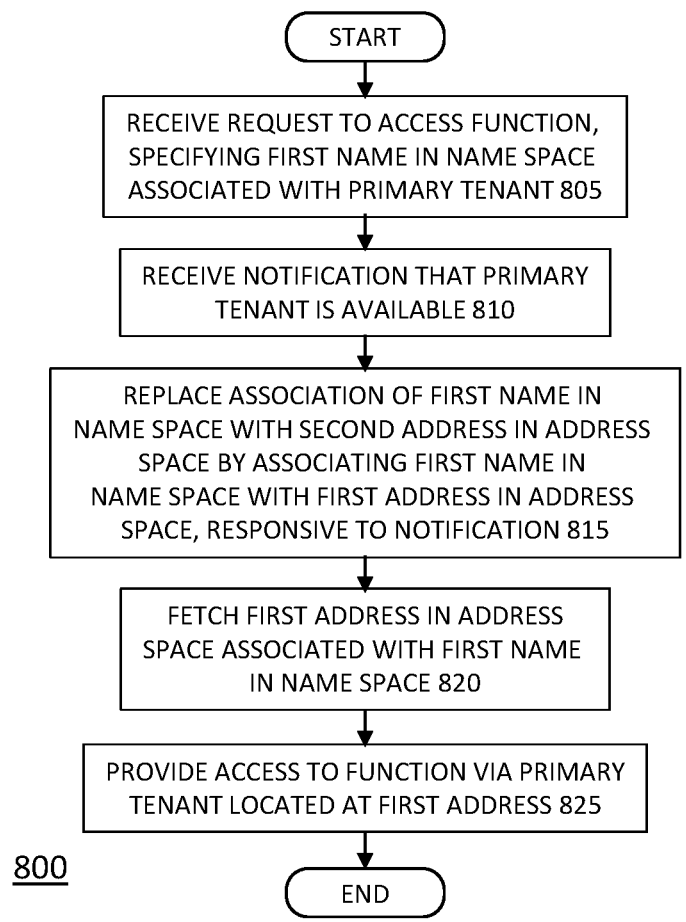
FIG. 8 depicts a flow diagram illustrating aspects of tenant-to-tenant failover within a multi-tenant cloud based computing environment in accordance with disclosed embodiments.

With reference to FIG. 8, one embodiment provides for switching back to the primary tenant to provide the function when it becomes available after having switched to the secondary tenant because the primary tenant was unavailable. Just like logic blocks 705 and 720, the process starts with logic block 805 receiving a request to access the function, the request specifying the first name in the name space associated with the primary tenant. At some point in time, logic block 810 receives a notification that the primary tenant is now available again, and thus logic block 815, in response thereto, replaces the association of the first name in the name space with the second address in the address space by associating the first name in the name space with the first address in the address space. In other words, in one embodiment, the IP address associated with the domain name of the primary tenant in the domain name registry is updated to replace the IP address of the secondary tenant with the IP address of the primary tenant. Thereafter, logic block 820 fetches the first address in the address space associated with the first name in the name space, and logic block 825 provides access to the function via the primary tenant, now located at the first address.

Figure 9:
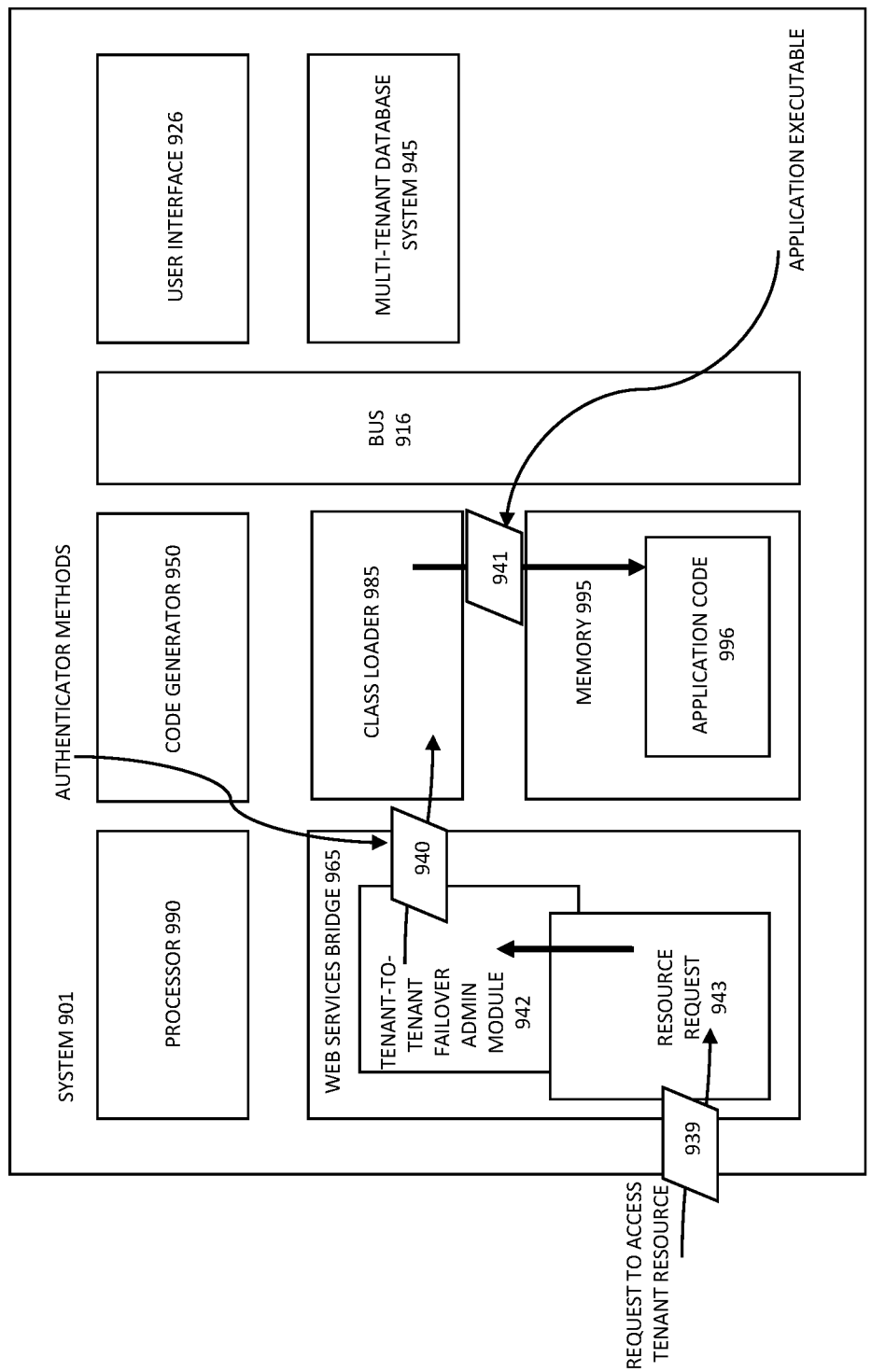
FIG. 9 shows a diagrammatic representation of a system within which embodiments may operate, be installed, integrated, or configured.

FIG. 9 shows a diagrammatic representation of a system 901 within which embodiments may operate, be installed, integrated, or configured. In accordance with one embodiment, there is a system 901 having at least a processor 990 and a memory 995 therein to execute implementing application code 996. Such a system 901 may communicatively interface with and cooperatively execute with the benefit of a hosted computing environment, such as a host organization, a multi-tenant environment, an on-demand service provider, a cloud based service provider, a client-server environment, etc.

According to the depicted embodiment, the system 901, which may operate within a host organization, includes the processor 990 and the memory 995 to execute instructions at the system 901. According to such an embodiment, the system 901 further includes instructions to identify a first one of a plurality of tenants in a multi-tenant cloud computing system as a primary tenant for providing a function (such as a business function) identify a second one of the plurality of tenants in the multi-tenant cloud computing system as a secondary tenant for providing the function should the primary tenant become unavailable, provide the function in the multi-tenant cloud computing system via the primary tenant when the primary tenant is available, and switch to providing the function in the multi-tenant cloud computing environment via the secondary tenant when the primary tenant is unavailable and the secondary tenant is available.

According to another embodiment of the system 901, a user interface 926 operates at a user client device remote from the system and communicatively interfaces with the system via a public Internet; in which the system operates at a host organization as a cloud based service provider to the user client device; in which the cloud based service provider hosts request interface exposed to the user client device via the public Internet, in which the request interface receives inputs from the client device to design the application as a request for services from the cloud based service provider.

Bus 916 interfaces the various components of the system 901 amongst each other, with any other peripheral(s) of the system 901, and with external components such as external network elements, other machines, client devices, cloud computing services, etc. Communications may further include communicating with external devices via a network interface over a LAN, WAN, or the public Internet.

FIG. 10A illustrates a block diagram of an environment 1098 in which an on-demand database service may operate in accordance with the described embodiments. Environment 1098 may include user systems 1012, network 1014, system 1016, processor system 1017, application platform 1018, network interface 1020, tenant data storage 1022, system data storage 1024, program code 1026, and process space 1028. In other embodiments, environment 1098 may not have all of the components listed and/or may have other elements instead of, or in addition to, those listed above.

Figure 10B:
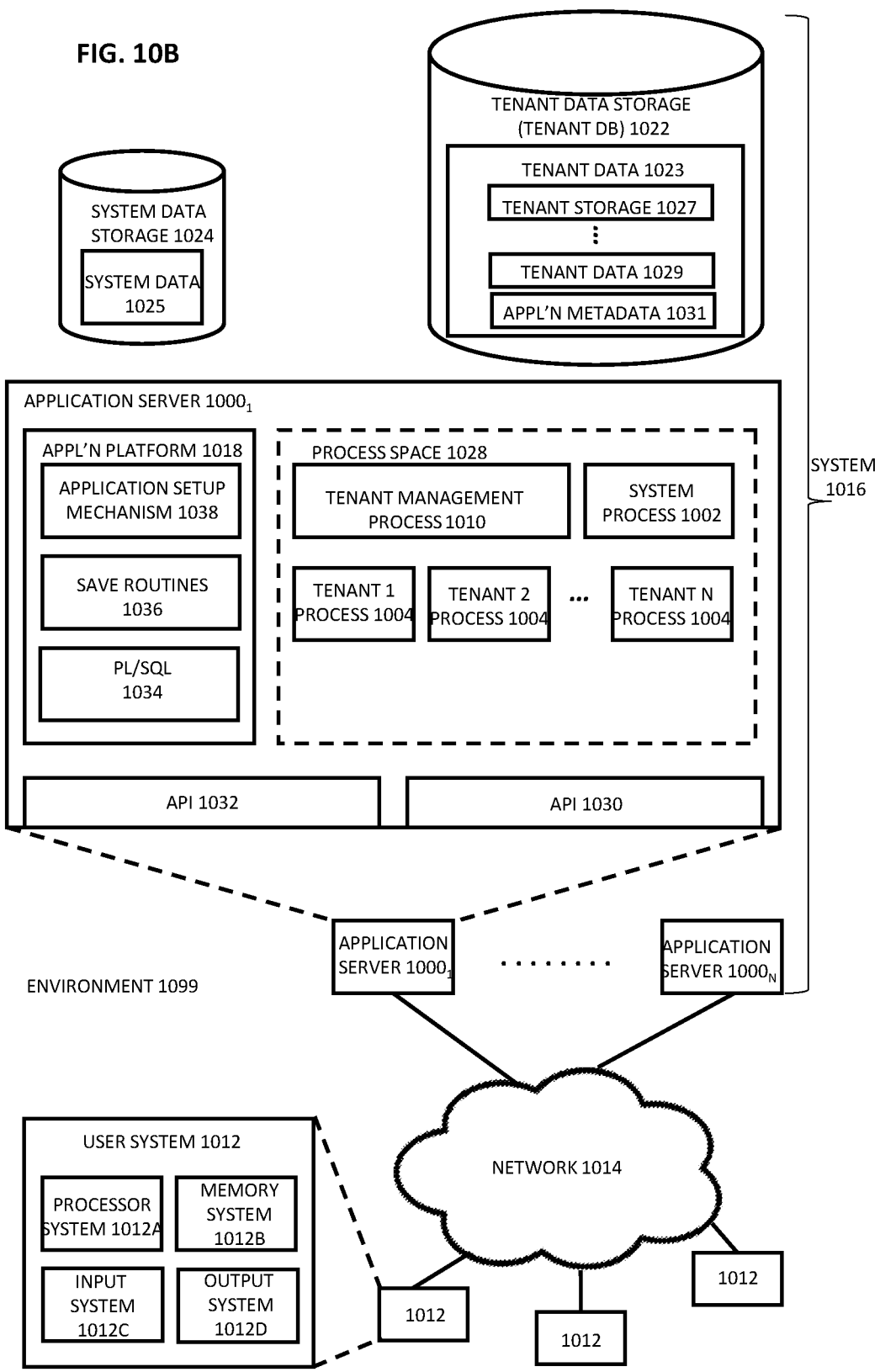
FIG. 10B illustrates another block diagram of an embodiment of elements of FIG. 10A and various possible interconnections between such elements in accordance with the described embodiments.

Environment 1098 is an environment in which an on-demand database service exists. User system 1012 may be any machine or system that is used by a user to access a database user system. For example, any of user systems 1012 can be a handheld computing device, a mobile phone, a laptop computer, a work station, and/or a network of computing devices. As illustrated in FIG. 10A (and in more detail in FIG. 10B) user systems 1012 might interact via a network 1014 with an on-demand database service, which is system 1016.

An on-demand database service, such as system 1016, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 1016" and "system 1016" is used interchangeably herein. A database image may include one or more database objects. A relational database management system (RDMS) or the equivalent may execute storage and retrieval of information against the database object(s). Application platform 1018 may be a framework that allows the applications of system 1016 to run, such as the hardware and/or software, e.g., the operating system. In an embodiment, on-demand database service 1016 may include an application platform 1018 that enables creation, managing and executing one or more applications developed by the provider of the on-demand database service, users accessing the on-demand database service via user systems

1012, or third party application developers accessing the on-demand database service via user systems 1012.

The users of user systems 1012 may differ in their respective capacities, and the capacity of a particular user system 1012 might be entirely determined by permissions (permission levels) for the current user. For example, where a salesperson is using a particular user system 1012 to interact with system 1016, that user system has the capacities allotted to that salesperson. However, while an administrator is using that user system to interact with system 1016, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 1014 is any network or combination of networks of devices that communicate with one another. For example, network 1014 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it is understood that the networks that the claimed embodiments may utilize are not so limited, although TCP/IP is a frequently implemented protocol.

User systems 1012 might communicate with system 1016 using TCP/IP and, at a higher network level, use other common Internet protocols to communicate, such as HTTP, FTP, AFS, WAP, etc. In an example where HTTP is used, user system 1012 might include an HTTP client commonly referred to as a "browser" for sending and receiving HTTP messages to and from an HTTP server at system 1016. Such an HTTP server might be implemented as the sole network interface between system 1016 and network 1014, but other techniques might be used as well or instead. In some implementations, the interface between system 1016 and network 1014 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 1016, shown in FIG. 10A, implements a web-based customer relationship management (CRM) system. For example, in one embodiment, system 1016 includes application servers configured to implement and execute CRM software applications as well as provide related data, code, forms, webpages and other information to and from user systems 1012 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 1016 implements applications other than, or in addition to, a CRM application. For example, system 1016 may provide tenant access to multiple hosted (standard and custom) applications, including a CRM application. User (or third party developer) applications, which may or may not include CRM, may be supported by the application platform 1018, which manages creation, storage of the applications into one or more database objects and executing of the applications in a virtual machine in the process space of the system 1016.

One arrangement for elements of system 1016 is shown in FIG. 10A, including a network interface 1020, application platform 1018, tenant data storage 1022 for tenant data 1023, system data storage 1024 for system data 1025 accessible to system 1016 and possibly multiple tenants, program code 1026 for implementing various functions of system 1016, and a process space 1028 for executing MTS system processes and tenant-specific processes, such as running applications as part of an application hosting service. Additional processes that may execute on system 1016 include database indexing processes.

Several elements in the system shown in FIG. 10A include conventional, well-known elements that are explained only briefly here. For example, each user system 1012 may include a desktop personal computer, workstation, laptop, PDA, cell phone, or any wireless access protocol (WAP) enabled device or any other computing device capable of interfacing directly or indirectly to the Internet or other network connection. User system 1012 typically runs an HTTP client, e.g., a browsing program, such as Microsoft's Internet Explorer browser, a Mozilla or Firefox browser, an Opera, or a WAP-enabled browser in the case of a smartphone, tablet, PDA or other wireless device, or the like, allowing a user (e.g., subscriber of the multi-tenant database system) of user system 1012 to access, process and view information, pages and applications available to it from system 1016 over network 1014. Each user system 1012 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 1016 or other systems or servers. For example, the user interface device can be used to access data and applications hosted by system 1016, and to perform searches on stored data, and otherwise allow a user to interact with various GUI pages that may be presented to a user. As discussed above, embodiments are suitable for use with the Internet, which refers to a specific global internetwork of networks. However, it is understood that other networks can be used instead of the Internet, such as an intranet, an extranet, a virtual private network (VPN), a non-TCP/IP based network, any LAN or WAN or the like.

According to one embodiment, each user system 1012 and all of its components are operator configurable using applications, such as a browser, including computer code run using a central processing unit such as an Intel Pentium® processor or the like. Similarly, system 1016 (and additional instances of an MTS, where more than one is present) and all of their components might be operator configurable using application(s) including computer code to run using a central processing unit such as processor system 1017, which may include an Intel Pentium® processor or the like, and/or multiple processor units.

According to one embodiment, each system 1016 is configured to provide webpages, forms, applications, data and media content to user (client) systems 1012 to support the access by user systems 1012 as tenants of system 1016. As such, system 1016 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS may include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It is understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

FIG. 10B illustrates another block diagram of an embodiment of elements of FIG. 10A and various possible interconnections between such elements in accordance with the described embodiments. FIG. 10B also illustrates environment 1099. However, in FIG. 10B, the elements of system 1016 and various interconnections in an embodiment are illustrated in further detail. More particularly, FIG. 10B shows that user system 1012 may include a processor system 1012A, memory system 1012B, input system 1012C, and output system 1012D. FIG. 10B shows network 1014 and system 1016. FIG. 10B also shows that system 1016 may include tenant data storage 1022, having therein tenant data 1023, which includes, for example, tenant storage space 1027, tenant data 1029, and application metadata 1031. System data storage 1024 is depicted as having therein system data 1025. Further depicted within the expanded detail of application servers $1000_{1-N}$ are User Interface (UI) 1030, Application Program Interface (API) 1032, application platform 1018 includes PL/SOQL 1034, save routines 1036, application setup mechanism 1038, process space 1028 includes system process space 1002, tenant 1-N process spaces 1004, and tenant management process space 1010. In other embodiments, environment 1099 may not have the same elements as those listed above and/or may have other elements instead of, or in addition to, those listed above.

User system 1012, network 1014, system 1016, tenant data storage 1022, and system data storage 1024 were discussed above in FIG. 10A. As shown by FIG. 10B, system 1016 may include a network interface 1020 (of FIG. 10A) implemented as a set of HTTP application servers 1000, an application platform 1018, tenant data storage 1022, and system data storage 1024. Also shown is system process space 1002, including individual tenant process spaces 1004 and a tenant management process space 1010. Each application server 1000 may be configured to tenant data storage 1022 and the tenant data 1023 therein, and system data storage 1024 and the system data 1025 therein to serve requests of user systems 1012. The tenant data 1023 might be divided into individual tenant storage areas (e.g., tenant storage space 1027), which can be either a physical arrangement and/or a logical arrangement of data. Within each tenant storage space 1027, tenant data 1029, and application metadata 1031 might be similarly allocated for each user. For example, a copy of a user's most recently used (IVIRU) items might be stored to tenant data 1029. Similarly, a copy of IVIRU items for an entire organization that is a tenant might be stored to tenant storage space 1027. A UI 1030 provides a user interface and an API 1032 provides an application programmer interface into system 1016 resident processes to users and/or developers at user systems 1012. The tenant data and the system data may be stored in various databases, such as one or more Oracle™ databases.

Application platform 1018 includes an application setup mechanism 1038 that supports application developers' creation and management of applications, which may be saved as metadata into tenant data storage 1022 by save routines 1036 for execution by subscribers as one or more tenant process spaces 1004 managed by tenant management process space 1010 for example. Invocations to such applications may be coded using PL/SOQL 1034 that provides a programming language style interface extension to API 1032. Invocations to applications may be detected by one or more system processes, which manages retrieving application metadata 1031 for the subscriber making the invocation and executing the metadata as an application in a virtual machine.

Each application server 1000 may be communicably coupled to database systems, e.g., having access to system data 1025 and tenant data 1023, via a different network connection. For example, one application server $1000_1$ might be coupled via the network 1014 (e.g., the Internet), another application server $1000_{N-1}$ might be coupled via a direct network link, and another application server $1000_N$ might be coupled by yet a different network connection. Transfer Control Protocol and Internet Protocol (TCP/IP) are typical protocols for communicating between application servers 1000 and the database system. However, it will be apparent to one skilled in the art that other transport protocols may be used to optimize the system depending on the network interconnect used.

In certain embodiments, each application server 1000 is configured to handle requests for any user associated with any organization that is a tenant. Because it is desirable to be able to add and remove application servers from the server pool at any time for any reason, there is preferably no server affinity for a user and/or organization to a specific application server 1000. In one embodiment, therefore, an interface system implementing a load balancing function (e.g., an F5 Big-IP load balancer) is communicably coupled between the application servers 1000 and the user systems 1012 to distribute requests to the application servers 1000. In one embodiment, the load balancer uses a least connections algorithm to route user requests to the application servers 1000. Other examples of load balancing algorithms, such as round robin and observed response time, also can be used. For example, in certain embodiments, three consecutive requests from the same user may hit three different application servers 1000, and three requests from different users may hit the same application server 1000. In this manner, system 1016 is multi-tenant, in which system 1016 handles storage of, and access to, different objects, data and applications across disparate users and organizations.

As an example of storage, one tenant might be a company that employs a sales force where each salesperson uses system 1016 to manage their sales process. Thus, a user might maintain contact data, leads data, customer follow-up data, performance data, goals and progress data, etc., all applicable to that user's personal sales process (e.g., in tenant data storage 1022). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 1016 that are allocated at the tenant level while other data structures might be managed at the user level. Because an MTS might support multiple tenants including possible competitors, the MTS may have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 1016 might also maintain system level data usable by multiple tenants or other data. Such system level data might include industry reports, news, postings, and the like that are sharable among tenants.

In certain embodiments, user systems 1012 (which may be client systems) communicate with application servers 1000 to request and update system-level and tenant-level data from system 1016 that may require sending one or more queries to tenant data storage 1022 and/or system data storage 1024. System 1016 (e.g., an application server 1000 in system 1016) automatically generates one or more SQL statements (e.g., one or more SQL queries) that are designed to access the desired information. System data storage 1024 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects as described herein. It is understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It is understood that the word "entity" may also be used interchangeably herein with "object" and "table."

In some multi-tenant database systems, tenants may be allowed to create and store custom objects, or they may be allowed to customize standard entities or objects, for example by creating custom fields for standard objects, including custom index fields. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

FIG. 11 illustrates a diagrammatic representation of a machine 1100 in the exemplary form of a computer system, in accordance with one embodiment, within which a set of instructions, for causing the machine/computer system 1100 to perform any one or more of the methodologies discussed herein, may be executed. In alternative embodiments, the machine may be connected (e.g., networked) to other machines in a Local Area Network (LAN), an intranet, an extranet, or the public Internet. The machine may operate in the capacity of a server or a client machine in a client-server network environment, as a peer machine in a peer-to-peer (or distributed) network environment, as a server or series of servers within an on-demand service environment. Certain embodiments of the machine may be in the form of a personal computer (PC), a tablet PC, a set-top box (STB), a Personal Digital Assistant (PDA), a cellular telephone, a web appliance, a server, a network router, switch or bridge, computing system, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 1100 includes a processor 1102, a main memory 1104 (e.g., read-only memory (ROM), flash memory, dynamic random access memory (DRAM) such as synchronous DRAM (SDRAM) or Rambus DRAM (RDRAM), etc., static memory such as flash memory, static random access memory (SRAM), volatile but high-data rate RAM, etc.), and a secondary memory 1118 (e.g., a persistent storage device including hard disk drives and a persistent database and/or a multi-tenant database implementation), which communicate with each other via a bus 1130. Main memory 1104 includes a web services bridge 1124 and a tenant-to-tenant failover administration module 1125 and a parser 1123 by which to communicate with another web services platform, retrieve, and parse a schema to identify methods provided by the web service at the other web services platform in accordance with described embodiments. Main memory 1104 and its sub-elements are operable in conjunction with processing logic 1126 and processor 1102 to perform the methodologies discussed herein.

Processor 1102 represents one or more general-purpose processing devices such as a microprocessor, central processing unit, or the like. More particularly, the processor 1102 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 1102 may also be one or more special-purpose processing devices such as an application specific integrated circuit (ASIC), a field programmable gate array (FPGA), a digital signal processor (DSP), network processor, or the like. Processor 1102 is configured to execute the processing logic 1126 for performing the operations and functionality which is discussed herein.

The computer system 1100 may further include a network interface card 1108. The computer system 1100 also may include a user interface 1110 (such as a video display unit, a liquid crystal display, etc.), an alphanumeric input device 1112 (e.g., a keyboard), a cursor control device 1114 (e.g., a mouse), and a signal generation device 1116 (e.g., an integrated speaker). The computer system 1100 may further include peripheral device 1136 (e.g., wireless or wired communication devices, memory devices, storage devices, audio processing devices, video processing devices, etc.).

The secondary memory 1118 may include a non-transitory machine-readable storage medium or a non-transitory computer readable storage medium or a non-transitory machine-accessible storage medium 1131 on which is stored one or more sets of instructions (e.g., software 1122) embodying any one or more of the methodologies or functions described herein. The software 1122 may also reside, completely or at least partially, within the main memory 1104 and/or within the processor 1102 during execution thereof by the computer system 1100, the main memory 1104 and the processor 1102 also constituting machine-readable storage media. The software 1122 may further be transmitted or received over a network 1120 via the network interface card 1108.

While the subject matter disclosed herein has been described by way of example and in terms of the specific embodiments, it is to be understood that the claimed embodiments are not limited to the explicitly enumerated embodiments disclosed. To the contrary, the disclosure is intended to cover various modifications and similar arrangements as are apparent to those skilled in the art. Therefore, the scope of the appended claims are to be accorded the broadest interpretation so as to encompass all such modifications and similar arrangements. It is to be understood that the above description is intended to be illustrative, and not restrictive. Many other embodiments will be apparent to those of skill in the art upon reading and understanding the above description. The scope of the disclosed subject matter is therefore to be determined in reference to the appended claims, along with the full scope of equivalents to which such claims are entitled.

What is claimed is:

1. A method performed by a system having at least a processor and a memory therein, the method comprising:
    identifying, by a first name in a name space, a first one of a plurality of tenants in a multi-tenant cloud computing system as a primary tenant for providing a function to other of the plurality of tenants in the multi-tenant cloud computing system;
    associating the first name in the name space with a first address in an address space;
    identifying, by a second name in the name space, a second one of the plurality of tenants in the multi-tenant cloud computing system as a secondary tenant for providing the function to the other of the plurality of tenants should the primary tenant become unavailable;
    associating the second name in the name space with a second address in the address space;
    providing the function to the other of the plurality of tenants in the multi-tenant cloud computing system via the primary tenant when the primary tenant is available; and
    switching to providing the function to the other of the plurality of tenants in the multi-tenant cloud computing environment via the secondary tenant when the primary tenant is unavailable and the secondary tenant is available by:
        replacing the association of the first name in the name space with the first address in the address space by newly associating the first name in the name space with the second address in the address space;
        receiving a request to access the function, the request specifying the first name in the name space associated with the primary tenant;
        fetching the second address in the address space newly associated with the first name in the name space; and
        providing access to the function via the secondary tenant located at the second address.

2. The method of claim 1, wherein the multi-tenant cloud computing system comprises a plurality of points of deployment among which the plurality of tenants are distributed, wherein each of the plurality of tenants is assigned to only a single point of deployment;
    wherein identifying the first one of the plurality of tenants as the primary tenant for providing the function comprises identifying a first one of the plurality of tenants assigned to a first one of the plurality of points of deployment as the primary tenant for providing the function; and
    wherein identifying the second one of the plurality of tenants as the secondary tenant for providing the function should the primary tenant become unavailable comprises identifying a second one of the plurality of tenants assigned to a second one of the plurality of points of deployment as the secondary tenant for providing the function should the primary tenant become unavailable.

3. The method of claim 1, wherein switching to providing the function in the multi-tenant cloud computing environment via the secondary tenant when the primary tenant is unavailable and the secondary tenant is available comprises:
    receiving a notification that the primary tenant is unavailable; and
    initiating the switching, responsive to receiving the notification, wherein the switching is initiated according to one of:
    receiving user input to initiate the switching, and
    automatically initiating the switching.

4. The method of claim 1,
    wherein identifying the primary tenant by the first name in the name space comprises:
    associating a first unique Uniform Resource Locator (URL) string with a unique identifier of the first one of the plurality of tenants in the multi-tenant cloud computing system; and
    identifying the primary tenant by the first unique URL string;
    wherein associating the first name in the name space with the first address in an address space comprises associating the first unique URL string with a first Internet Protocol (IP) address in a domain name registry;
    wherein identifying the secondary tenant by the second name in the name space comprises:
    associating a second unique Uniform Resource Locator (URL) string with a unique identifier of the second one of the plurality of tenants in the multi-tenant cloud computing system; and
    identifying the secondary tenant by the second unique URL string;
    wherein associating the second name in the name space with the second address in the address space comprises associating the second unique URL string with a second Internet Protocol (IP) address in the domain name registry.

5. The method of claim 1,
    wherein providing the function in the multi-tenant cloud computing system via the primary tenant when the primary tenant is available comprises:

receiving a request to access the function, the request specifying the first name in the name space associated with the primary tenant;
fetching the first address in the address space associated with the first name in the name space; and
providing access to the function via the primary tenant located at the first address.

6. The method of claim 1, further comprising:
switching back to providing the function in the multi-tenant cloud computing environment via the primary tenant when the primary tenant becomes available and the function is being provided in the multi-tenant cloud computing environment via the secondary tenant, comprising:
receiving a request to access the function, the request specifying the first name in the name space associated with the primary tenant;
receiving a notification that the primary tenant is available;
replacing the association of the first name in the name space with the second address in the address space by associating the first name in the name space with the first address in the address space;
fetching the first address in the address space associated with the first name in the name space; and
providing access to the function via the primary tenant located at the first address.

7. The method of claim 1, further comprising synchronizing one or more respective resources on the primary tenant and the secondary tenant in anticipation of switching to providing the function in the multi-tenant cloud computing environment via the secondary tenant when the primary tenant is unavailable and the secondary tenant is available.

8. A system to execute within a host organization, wherein the system comprises:
a processor and a memory to execute instructions at the system;
software instructions that, when executed by the processor, cause the system to:
identify, by a first name in a name space, a first one of a plurality of tenants in a multi-tenant cloud computing system as a primary tenant for providing a function to other of the plurality of tenants in the multi-tenant cloud computing system;
associate the first name in the name space with a first address in an address space;
identify, by a second name in the name space, a second one of the plurality of tenants in the multi-tenant cloud computing system as a secondary tenant for providing the function to the other of the plurality of tenants should the primary tenant become unavailable;
associate the second name in the name space with a second address in an address space;
provide the function to the other of the plurality of tenants in the multi-tenant cloud computing system via the primary tenant when the primary tenant is available; and
switch to providing the function to the other of the plurality of tenants in the multi-tenant cloud computing environment via the secondary tenant when the primary tenant is unavailable and the secondary tenant is available with software instructions that, when executed by the processor, cause the system to:
replace the association of the first name in the name space with the first address in the address space by newly associating the first name in the name space with the second address in the address space;
receive a request to access the function, the request specifying the first name in the name space associated with the primary tenant;
fetch the second address in the address space newly associated with the first name in the name space; and
provide access to the function via the secondary tenant located at the second address.

9. The system of claim 8, wherein the multi-tenant cloud computing system comprises a plurality of points of deployment among which the plurality of tenants are distributed, wherein each of the plurality of tenants is assigned to only a single point of deployment;
wherein the software instructions that cause the system to identify the first one of the plurality of tenants as the primary tenant for providing the function comprises software instructions to cause the system to identify a first one of the plurality of tenants assigned to a first one of the plurality of points of deployment as the primary tenant for providing the function; and
wherein the software instructions that cause the system to identify the second one of the plurality of tenants as the secondary tenant for providing the function should the primary tenant become unavailable comprises software instructions to cause the system to identify a second one of the plurality of tenants assigned to a second one of the plurality of points of deployment as the secondary tenant for providing the function should the primary tenant become unavailable.

10. The system of claim 8, wherein the software instructions that cause the system to switch to providing the function in the multi-tenant cloud computing environment via the secondary tenant when the primary tenant is unavailable and the secondary tenant is available comprises software instructions that cause the system to:
receive a notification that the primary tenant is unavailable; and
initiate the switch, responsive to receipt of the notification, wherein the switch is initiated according to one of:
receiving user input to initiate the switching, and
automatically initiating the switching.

11. The system of claim 8,
wherein the software instructions that cause the system to identify the primary tenant by the first name in the name space comprises software instructions that cause the system to:
associate a first unique Uniform Resource Locator (URL) string with a unique identifier of the first one of the plurality of tenants in the multi-tenant cloud computing system; and
identify the primary tenant by the first unique URL string;
wherein the software instructions that cause the system to associate the first name in the name space with the first address in an address space comprises software instructions that cause the system to associate the first unique URL string with a first Internet Protocol (IP) address in a domain name registry;
wherein the software instructions that cause the system to identify the secondary tenant by the second name in the name space comprises software instructions that cause the system to:
associate a second unique Uniform Resource Locator (URL) string with a unique identifier of the second one of the plurality of tenants in the multi-tenant cloud computing system; and
identify the secondary tenant by the second unique URL string;

wherein the software instructions that cause the system to associate the second name in the name space with the second address in the address space comprises software instructions that cause the system to associate the second unique URL string with a second Internet Protocol (IP) address in the domain name registry.

12. The system of claim 8,
wherein the software instructions that cause the system to provide the function in the multi-tenant cloud computing system via the primary tenant when the primary tenant is available comprises software instructions that cause the system to:
receive a request to access the function, the request specifying the first name in the name space associated with the primary tenant;
fetch the first address in the address space associated with the first name in the name space; and
provide access to the function via the primary tenant located at the first address.

13. The system of claim 8, further comprising software instructions that cause the system to:
switch back to providing the function in the multi-tenant cloud computing environment via the primary tenant when the primary tenant becomes available and the function is being provided in the multi-tenant cloud computing environment via the secondary tenant, comprising software instructions that cause the system to:
receive a request to access the function, the request specifying the first name in the name space associated with the primary tenant;
receive a notification that the primary tenant is available;
replace the association of the first name in the name space with the second address in the address space by associating the first name in the name space with the first address in the address space;
fetch the first address in the address space associated with the first name in the name space; and
provide access to the function via the primary tenant located at the first address.

14. The system of claim 8, further comprising software instructions that cause the system to synchronize one or more respective resources on the primary tenant and the secondary tenant in anticipation of the switch to providing the function in the multi-tenant cloud computing environment via the secondary tenant when the primary tenant is unavailable and the secondary tenant is available.

15. Non-transitory computer readable storage media having instructions stored thereon that, when executed by a processor of a system, cause the system to:
identify, by a first name in a name space, a first one of a plurality of tenants in a multi-tenant cloud computing system as a primary tenant for providing a function to other of the plurality of tenants in the multi-tenant cloud computing system;
associate the first name in the name space with a first address in the address space;
identify, by a second name in the name space, a second one of the plurality of tenants in the multi-tenant cloud computing system as a secondary tenant for providing the function to the other of the plurality of tenants should the primary tenant become unavailable;
associate the second name in the name space with a second address in the address space;
provide the function to the other of the plurality of tenants in the multi-tenant cloud computing system via the primary tenant when the primary tenant is available; and switch to providing the function in the multi-tenant cloud computing environment via the secondary tenant when the primary tenant is unavailable and the secondary tenant is available with software instructions that, when executed by the processor, cause the system to:
replace the association of the first name in the name space with the first address in the address space by newly associating the first name in the name space with the second address in the address space;
receive a request to access the function, the request specifying the first name in the name space associated with the primary tenant;
fetch the second address in the address space newly associated with the first name in the name space; and
provide access to the function via the secondary tenant located at the second address.

16. The non-transitory computer readable storage media of claim 15, wherein the multi-tenant cloud computing system comprises a plurality of points of deployment among which the plurality of tenants are distributed, wherein each of the plurality of tenants is assigned to only a single point of deployment;
wherein the instructions that cause the system to identify the first one of the plurality of tenants as the primary tenant for providing the function comprises instructions that cause the system to identify a first one of the plurality of tenants assigned to a first one of the plurality of points of deployment as the primary tenant for providing the function; and
wherein the instructions that cause the system to identify the second one of the plurality of tenants as the secondary tenant for providing the function should the primary tenant become unavailable comprises instructions that cause the system to identify a second one of the plurality of tenants assigned to a second one of the plurality of points of deployment as the secondary tenant for providing the function should the primary tenant become unavailable.

17. The non-transitory computer readable storage media of claim 15, wherein the instructions that cause the system to switching to providing the function in the multi-tenant cloud computing environment via the secondary tenant when the primary tenant is unavailable and the secondary tenant is available comprises instructions that cause the system to:
receive a notification that the primary tenant is unavailable; and
initiate the switching, responsive to receiving the notification, wherein the switching is initiated according to one of:
receiving user input to initiate the switching, and
automatically initiating the switching.

18. The non-transitory computer readable storage media of claim 15,
wherein the instructions that cause the system to identify the primary tenant by the first name in the name space comprises instructions that cause the system to:
associate a first unique Uniform Resource Locator (URL) string with a unique identifier of the first one of the plurality of tenants in the multi-tenant cloud computing system; and
identify the primary tenant by the first unique URL string;
wherein the instructions that cause the system to associate the first name in the name space with the first address in an address space comprises instructions that cause the system to associate the first unique URL string with a first Internet Protocol (IP) address in a domain name registry;

wherein the instructions that cause the system to identify the secondary tenant by the second name in the name space comprises instructions that cause the system to:

associate a second unique Uniform Resource Locator (URL) string with a unique identifier of the second one of the plurality of tenants in the multi-tenant cloud computing system; and identify the secondary tenant by the second unique URL string;

wherein the instructions that cause the system to associate the second name in the name space with the second address in the address space comprises instructions that cause the system to associate the second unique URL string with a second Internet Protocol (IP) address in the domain name registry.

19. The non-transitory computer readable storage media of claim 15, wherein the instructions that cause the system to provide the function in the multi-tenant cloud computing system via the primary tenant when the primary tenant is available comprises instructions that cause the system to:

receive a request to access the function, the request specifying the first name in the name space associated with the primary tenant;

fetch the first address in the address space associated with the first name in the name space; and provide access to the function via the primary tenant located at the first address.

20. The non-transitory computer readable storage media of claim 15, further comprising instructions that cause the system to:

switch back to providing the function in the multi-tenant cloud computing environment via the primary tenant when the primary tenant becomes available and the function is being provided in the multi-tenant cloud computing environment via the secondary tenant, comprising instructions that cause the system to:

receive a request to access the function, the request specifying the first name in the name space associated with the primary tenant;

receive a notification that the primary tenant is available;

replace the association of the first name in the name space with the second address in the address space by associating the first name in the name space with the first address in the address space;

fetch the first address in the address space associated with the first name in the name space; and provide access to the function via the primary tenant located at the first address.

21. The non-transitory computer readable storage media of claim 15, further comprising instructions that cause the system to synchronize one or more respective resources on the primary tenant and the secondary tenant in anticipation of switching to providing the function in the multi-tenant cloud computing environment via the secondary tenant when the primary tenant is unavailable and the secondary tenant is available.

* * * * *